(12) United States Patent
Zhao et al.

(10) Patent No.: US 11,733,422 B2
(45) Date of Patent: Aug. 22, 2023

(54) PORTABLE TERAHERTZ SECURITY INSPECTION APPARATUS

(71) Applicants: Nuctech Company Limited, Beijing (CN); Tsinghua University, Beijing (CN)

(72) Inventors: Ziran Zhao, Beijing (CN); Yingxin Wang, Beijing (CN); Meng Chen, Beijing (CN); Xuming Ma, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 188 days.

(21) Appl. No.: 17/309,908

(22) PCT Filed: Oct. 9, 2019

(86) PCT No.: PCT/CN2019/110140
§ 371 (c)(1),
(2) Date: Jun. 28, 2021

(87) PCT Pub. No.: WO2020/134320
PCT Pub. Date: Jul. 2, 2020

(65) Prior Publication Data
US 2022/0066065 A1 Mar. 3, 2022

(30) Foreign Application Priority Data
Dec. 28, 2018 (CN) .......................... 201811631709.6

(51) Int. Cl.
*G01V 8/20* (2006.01)
*G01V 5/00* (2006.01)
*G01V 8/00* (2006.01)

(52) U.S. Cl.
CPC .............. *G01V 8/20* (2013.01); *G01V 5/0008* (2013.01); *G01V 8/005* (2013.01)

(58) Field of Classification Search
CPC ......... G01V 8/20; G01V 5/0008; G01V 8/005
See application file for complete search history.

(56) References Cited

U.S. PATENT DOCUMENTS

2005/0122258 A1   6/2005   Biasing et al.
2009/0195435 A1   8/2009   Kapilevich et al.
(Continued)

FOREIGN PATENT DOCUMENTS

CN   103575407 A   2/2014
CN   103608699 A   2/2014
(Continued)

OTHER PUBLICATIONS

"European Application Serial No. 19904127.8, European Search Report dated Nov. 9, 2022", (Nov. 9, 2022), 12 pgs.
(Continued)

*Primary Examiner* — David P Porta
*Assistant Examiner* — Fani Polyzos Boosalis
(74) *Attorney, Agent, or Firm* — Schwegman Lundberg & Woessner, P.A.

(57) ABSTRACT

The present disclosure provides a portable terahertz security inspection apparatus, including: a carrying body; a terahertz emitting device arranged on the carrying body, wherein the terahertz emitting device includes a terahertz signal source and an emitting unit connected to the terahertz signal source and configured to emit a terahertz wave; a terahertz detector arranged on the carrying body and configured to receive the terahertz wave reflected from an inspected object; a data acquisition and processing system arranged on the carrying body and connected to the terahertz detector, wherein the data acquisition and processing system is configured to receive a scan data for the inspected object from the terahertz detector and generate a terahertz image; and a display device connected to the data acquisition and processing system and configured to receive and display the terahertz image from the data acquisition and processing system. The portable terahertz security inspection apparatus does not need to be equipped with a mechanical scanning system, so that a volume and a weight of the terahertz security inspection apparatus may be greatly reduced, and a security inspector may move the terahertz security inspection apparatus manually to perform scanning of the imaging area.

14 Claims, 4 Drawing Sheets

(56) References Cited

U.S. PATENT DOCUMENTS

| | | | |
|---|---|---|---|
| 2012/0075477 A1* | 3/2012 | Daly | H04N 5/33 |
| | | | 348/E5.09 |
| 2012/0194376 A1* | 8/2012 | Daly | G01S 13/887 |
| | | | 342/22 |
| 2012/0273681 A1 | 11/2012 | Schulkin et al. | |
| 2013/0277558 A1 | 10/2013 | Yamamura | |

FOREIGN PATENT DOCUMENTS

| | | | |
|---|---|---|---|
| CN | 105044017 | A | 11/2015 |
| CN | 106094050 | A | 11/2016 |
| CN | 106308699 | A | 1/2017 |
| CN | 108828683 | A | 11/2018 |
| CN | 109581530 | A | 4/2019 |
| CN | 209446787 | U | 9/2019 |
| EP | 2204671 | | 4/2012 |
| EP | 3363357 | | 8/2018 |

OTHER PUBLICATIONS

"International Application Serial No. PCT/CN2019/110140, International Search Report dated Jan. 8, 2020", w/ English Translation, (Jan. 8, 2020), 8 pgs.

"International Application Serial No. PCT/CN2019/110140, Written Opinion dated Jan. 8, 2020", (Jan. 8, 2020), 6.

* cited by examiner

PORTABLE TERAHERTZ SECURITY INSPECTION APPARATUS

CROSS REFERENCE TO RELATED APPLICATION(S)

This application is a U.S. National Stage Filing under 35 U.S.C. § 371 from International Application No. PCT/CN2019/110140, filed on Oct. 9, 2019, and published as WO2020/134320 on Jul. 2, 2020, which claims the benefit of priority to Chinese patent Application No. 201811631709.6, filed on Dec. 28, 2018; the benefit of priority of each of which is hereby claimed herein, and which applications and publication are hereby incorporated herein by reference in their entireties.

TECHNICAL FIELD

The present disclosure relates to a field of security inspection technology, and in particular to a portable terahertz security inspection apparatus.

BACKGROUND

At present, traditional means of security inspection have gradually been unable to meet needs, especially in a field of body inspection. A combination of a metal detector and a manual search is currently a widely used means of body inspection. However, this combination often has a high false positive rate and a low efficiency, and is easily perceived and evaded by subversives. Terahertz wave is an electromagnetic wave with a frequency of 0.1 THz~10 THz (a wavelength of 30 µm~3 mm). Like millimeter waves and infrared rays on both sides of a spectrum of the terahertz wave, the terahertz wave may be used to develop new technologies in detection and imaging, so as to achieve important applications in security inspection, medical diagnosis, non-destructive testing, inspection and quarantine, and other fields. Especially in body inspection, because the terahertz wave has a photon energy far lower than that of X-ray, it does not cause ionizing radiation damage to a human body. Moreover, because the terahertz wave has a wavelength shorter than that of a millimeter wave, an image with a higher resolution may be obtained. Terahertz imaging technology has become one of the most promising schemes of body inspection, and has received extensive attention from many scientific research institutions and security inspection manufacturers at home and abroad.

Existing terahertz security inspection apparatus usually relies on mechanical scanning to obtain a whole body image output. For example, patent CN204882899U describes an optical path structure of a body inspection instrument, of which a core is a roller-type multi-faceted reflective rotating mirror that cooperates with many electric, mechanical and optical components to perform a scanning imaging on a human body. Patent CN105044017A describes another terahertz scanning imaging device that scans the human body by swinging and rotating two wedge mirrors in multiple dimensions. These apparatuses are bulky and complex, and consume a lot of energy. Some apparatuses require additional cooling systems. In practical use, these security inspection apparatuses may only be installed in a fixed position, and a security inspector needs to guide an inspected object to pass along a specific route. Some apparatuses require the inspected object to stand and wait at a specific position for scanning. Therefore, a security inspection rate is limited, and a risk of congestion is increased. In addition, these apparatuses often may only obtain human body images at some fixed angles of view, but are helpless for underarms, crotches, soles, and other concealed portions where contraband may be hidden. In addition, in order to obtain a terahertz image for an entire human body at a small scanning angle, it is usually required that the imaging position is not too close to the apparatus. This limits an improvement of imaging resolution, and sharply decreases an amount of the terahertz wave received by the detector, which causes problems such as blurred images and low detection sensitivity.

SUMMARY

According to the embodiments of the present disclosure, there is provided a portable terahertz security inspection apparatus, including:
 a carrying body;
 a terahertz emitting device arranged on the carrying body, wherein the terahertz emitting device includes a terahertz signal source and an emitting unit connected to the terahertz signal source and configured to emit a terahertz wave;
 a terahertz detector arranged on the carrying body and configured to receive the terahertz wave reflected from an inspected object;
 a data acquisition and processing system arranged on the carrying body and connected to the terahertz detector, wherein the data acquisition and processing system is configured to receive a scan data for the inspected object from the terahertz detector and generate a terahertz image; and
 a display device connected to the data acquisition and processing system and configured to receive and display the terahertz image from the data acquisition and processing system.

In some embodiments, the portable terahertz security inspection apparatus further includes a distance sensor arranged on the carrying body and connected to the data acquisition and processing system, and the distance sensor is configured to sense a distance between the inspected object and the portable terahertz security inspection apparatus.

In some embodiments, the data acquisition and processing system includes a data acquisition module configured to receive the scan data for the inspected object from the terahertz detector, a data processing module configured to generate the terahertz image based on the scan data, and an image processing module configured to identify a suspicious item contained in the terahertz image generated.

In some embodiments, the portable terahertz security inspection apparatus further includes an alarm device connected to the image processing module, and the alarm device is configured to issue an alarm in response to identifying the suspicious item contained in the terahertz image by the image processing module.

In some embodiments, the portable terahertz security inspection apparatus further includes an image acquisition system arranged on the carrying body and connected to the display device.

In some embodiments, the display device includes a display screen having a first display area for displaying the terahertz image and a second display area for displaying an image acquired by the image acquisition system.

In some embodiments, a power supply device is further provided on the carrying body so as to supply power to the portable terahertz security inspection apparatus.

In some embodiments, a control switch is further provided on the carrying body so as to control an operating state of the portable terahertz security inspection apparatus.

In some embodiments, the carrying body is formed as a box structure, the data acquisition and processing system is located inside the carrying body, and the terahertz emitting device is located on a top wall of the carrying body; the terahertz detector includes a terahertz lens arranged on a first sidewall of the carrying body and a terahertz detection chip connected to the terahertz lens and to the data acquisition and processing system.

In some embodiments, the terahertz detector further includes an adjustment flange configured to adjust a focal length of the terahertz lens.

In some embodiments, the display device includes a display base arranged on a second sidewall of the carrying body adjacent to a first sidewall installed with the terahertz lens, the display base is pivotally connected to the carrying body, and the display screen is arranged on a side of the display base close to the carrying body.

In some embodiments, the portable terahertz security inspection apparatus further includes a hand-held part arranged on a third sidewall of the carrying body opposite to the second sidewall.

In some embodiments, the carrying body is formed as a plate-shaped structure.

In some embodiments, the terahertz emitting device includes a plurality of emitting units, the plurality of emitting units and the terahertz detector are located on a first side of the carrying body, and the plurality of emitting units are arranged around the terahertz detector.

In some embodiments, the display device is arranged on a second side of the carrying body opposite to the first side.

In some embodiments, the portable terahertz security inspection apparatus further includes a hand-held part connected to one end of the carrying body.

DETAILED DESCRIPTION OF EMBODIMENTS

Although the present disclosure will be fully described with reference to the drawings containing the preferred embodiments of the present disclosure, it should be understood that those skilled in the art may modify the present disclosure while obtaining the technical effects of the present disclosure. Therefore, it should be understood that the above description is a broad disclosure for those ordinary skilled in the art, and its content is not intended to limit the exemplary embodiments described in the present disclosure.

In addition, in the following detailed description, for the convenience of explanation, many specific details are set forth to provide a comprehensive understanding of the embodiments of the present disclosure. Obviously, however, one or more embodiments may also be implemented without these specific details. In other cases, well-known structures and devices are shown in diagrammatic form to simplify the drawings.

According to a general inventive concept of the present disclosure, there is provided a portable terahertz security inspection apparatus, including: a carrying body; a terahertz emitting device arranged on the carrying body, wherein the terahertz emitting device includes a terahertz signal source and an emitting unit connected to the terahertz signal source and configured to emit a terahertz wave; a terahertz detector arranged on the carrying body and configured to receive the terahertz wave reflected from an inspected object; a data acquisition and processing system arranged on the carrying body and connected to the terahertz detector, wherein the data acquisition and processing system is configured to receive a scan data for the inspected object from the terahertz detector and generate a terahertz image; and a display device connected to the data acquisition and processing system and configured to receive and display the terahertz image from the data acquisition and processing system.

As shown in FIG. 1 to FIG. 4, the portable terahertz security inspection apparatus according to an exemplary embodiment of the present disclosure includes a carrying body 1 formed as a box structure, a terahertz emitting device 2, a terahertz detector 3, a data acquisition and processing system 4, and a display device 5. The terahertz emitting device 2 is arranged on a top wall of the carrying body 1, and includes a terahertz signal source 21 and an emitting unit (such as a horn antenna) 22 connected to the terahertz signal source 21. The emitting unit 22 is used to transmit a terahertz wave and shape the terahertz wave emitted. The horn antenna 22 emits the terahertz wave obliquely downward in a direction at a specific angle to a horizontal direction, so that the terahertz wave emitted may irradiate an inspected object 12 at an operating distance, and that a primary reflection of a reflection signal may be received by the terahertz detector 3. The terahertz detector 3 includes a terahertz lens 31 arranged on a first sidewall of the box structure and a terahertz detection chip 32 connected to the terahertz lens 31. The data acquisition and processing system 4 is located inside the carrying body 1 and is connected to the terahertz detection chip 32 so as to receive a scan data for the inspected object from the terahertz detector 3 and generate a terahertz image. The display device 5 is connected to the data acquisition and processing system 4 and is used to receive and display the terahertz image from the data acquisition and processing system 4.

The portable terahertz security inspection apparatus provided by the present disclosure does not need to be equipped with an internal scanning device. Instead, a security inspector may move the carrying body 1 manually to perform scanning of the imaging area. This method may greatly reduce a volume and a weight of the terahertz security inspection apparatus, so that a production cost of the apparatus is reduced, an energy consumption is reduced, and a space is saved. More importantly, due to a convenience of movement, the apparatus may perform partial imaging for a specific area at any angles, which greatly improves flexibility and practicability of the terahertz imaging technology, and perfectly solves the problem of insufficient local resolution of the terahertz image. In addition, the apparatus may be used to conduct a key detection on a location where contrabands may be hidden, so that an accuracy of the security inspection is improved.

Figure 2:
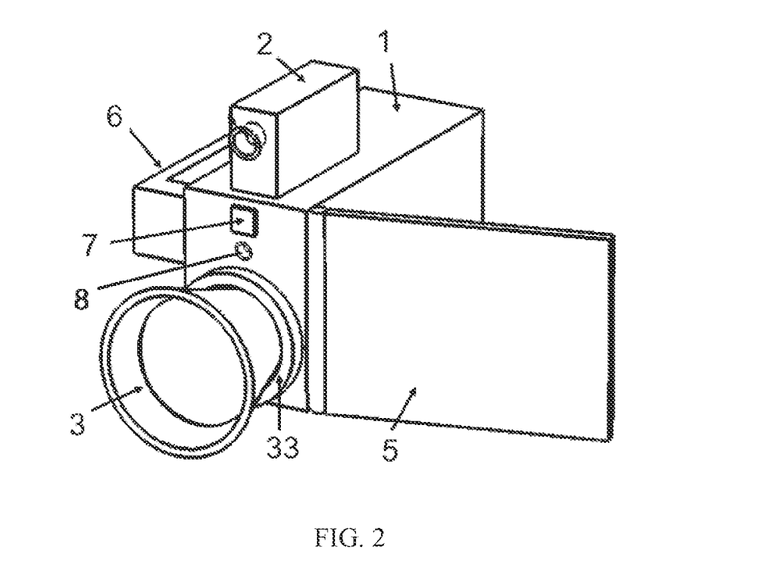
FIG. 2 shows a schematic three-dimensional diagram of a portable terahertz security inspection apparatus according to an exemplary embodiment of the present disclosure.
Figure 4:
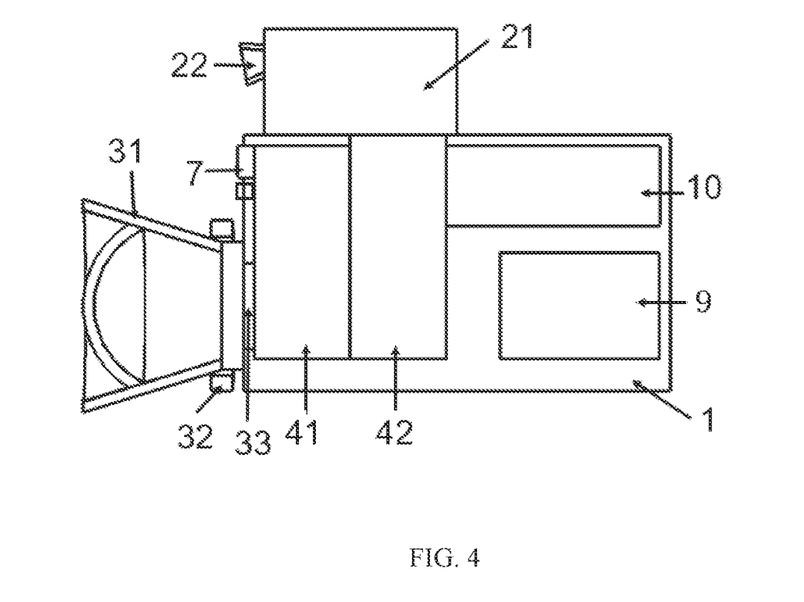
FIG. 4 shows a schematic structural diagram of the portable terahertz security inspection apparatus shown in FIG. 2.

As shown in FIG. 2 and FIG. 4, in an exemplary embodiment, the portable terahertz security inspection apparatus further includes a distance sensor 7 arranged on the carrying body 1. The distance sensor is suitable for sensing a distance between the inspected object and the portable terahertz security inspection apparatus. The distance sensor 7 is connected to the data acquisition and processing system 4 and transmit an electrical signal detected to the data acquisition and processing system 4. Here, the distance sensor 7 includes, but is not limited to an infrared distance sensor, an ultrasonic distance sensor and a microwave distance sensor.

Figure 1:
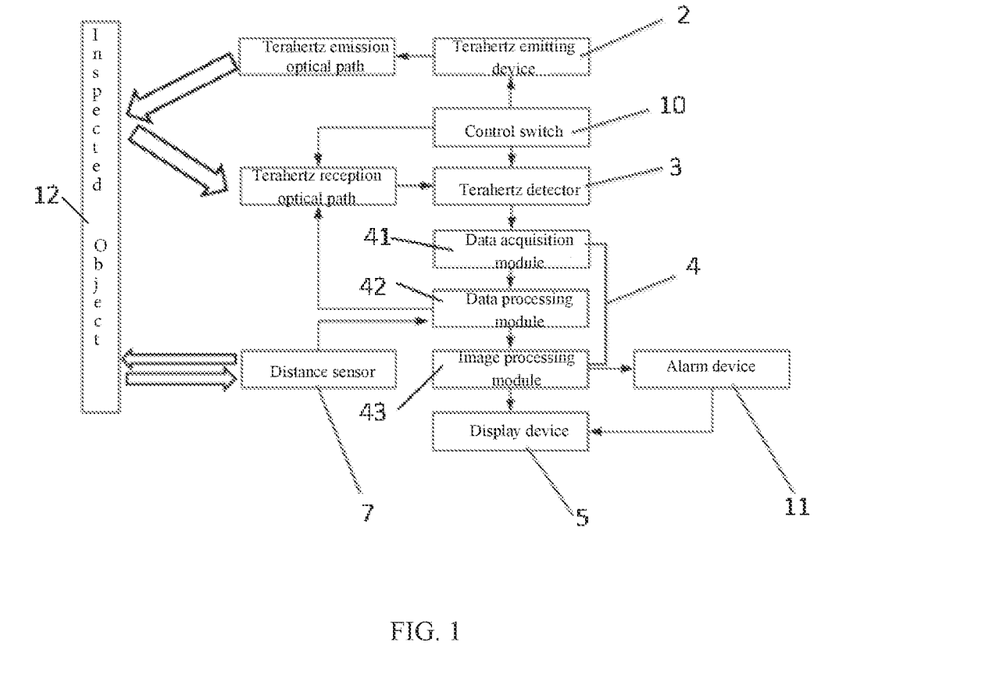
FIG. 1 shows a schematic operating diagram of a portable terahertz security inspection apparatus according to an exemplary embodiment of the present disclosure.

As shown in FIG. 1 and FIG. 4, in an exemplary embodiment, the data acquisition and processing system 4 includes a data acquisition module 41 and a data processing module 42. The data acquisition module 41 may receive the electrical signal transmitted from the terahertz detection chip 10 and the distance sensor 7, converts the electrical signal into a digital signal, and transmits the digital signal to the data processing module 42. The data processing module 42 is a calculation and control center of the entire portable terahertz security inspection apparatus. It is mainly used to pre-process the signal acquired by the terahertz detection chip 10, calculate the distance between the apparatus and the inspected object based on the signal acquired by the distance sensor 7, then compensate and optimize the pre-processed signal based on the imaging distance, convert the optimized signal into image information, and transmit the image information to the display device 5 for output.

As shown in FIG. 1, in an exemplary embodiment, the data acquisition and processing system 4 further includes an image processing module 43 connected to the data processing module 42 and an alarm device 11 connected to the image processing module 43. The image processing module 43 is suitable for determining whether a suspicious item is contained in the terahertz image generated, based on an internal database. If it is determined that a suspicious item is contained in the terahertz image generated, an alarm is issued. For example, an intuitive result of determination may be provided by means of text display, image annotation, etc. on the display device 5.

As shown in FIG. 2 and FIG. 4, in an exemplary embodiment, the portable terahertz security inspection apparatus further includes an image acquisition system 8 arranged on the carrying body 1 and connected to the display device 5. The image acquisition system 8 may perform visible light real-time imaging and provide image information of the inspected object for comparison with the terahertz image, which may be used for user's reference.

In an exemplary embodiment not shown, the display device 5 includes a display screen 52. The display screen 52 includes a first display area for displaying the terahertz image and a second display area for displaying the image acquired by the image acquisition system 8, so that a user may compare the image acquired by the image acquisition system with the terahertz image.

As shown in FIG. 2 and FIG. 4, in an exemplary embodiment, the portable terahertz security inspection apparatus further includes an adjustment flange 33 for adjusting a focal length of the terahertz lens 31 so that the imaging distance may be adjusted by the adjustment flange 33. In this way, a manual or auto focus function may be achieved, and an efficiency of collecting the terahertz wave may be improved. The terahertz lens 31 may be adjusted manually by the adjustment flange 33, or may be automatically calibrated based on a distance parameter measured by the distance sensor 7.

In some embodiments not shown in the present disclosure, the portable terahertz security inspection apparatus may further have an anti-shake processing function so as to avoid problems such as image blur and distortion caused by a user's hand shaking. In addition, in some embodiments not shown in the present disclosure, the portable terahertz security inspection apparatus may further have a motion compensation function so as to reduce a degradation of image quality caused by a movement of the inspected object. Both functions described above may be achieved by appropriate data processing algorithms based on real-time distance sensing information.

Figure 3:
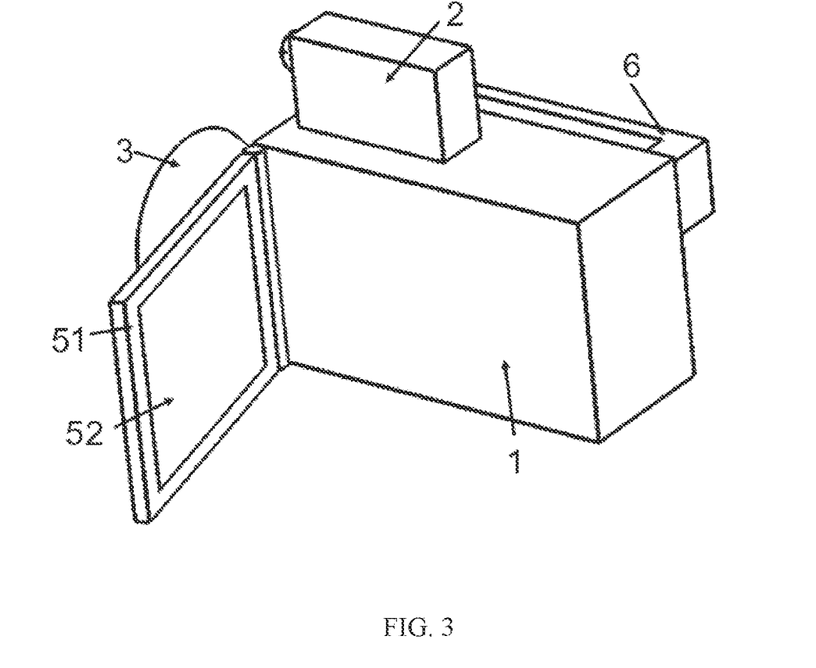
FIG. 3 shows another schematic three-dimensional diagram of the portable terahertz security inspection apparatus shown in FIG. 2.

As shown in FIG. 2 and FIG. 3, in an exemplary embodiment, the display device 5 includes a display base 51 arranged on a second sidewall of the carrying body 1 adjacent to a first sidewall installed with the terahertz lens 31. The display base 51 is pivotally connected to the carrying body 1, and the display screen 52 is arranged on a side of the display base 51 close to the carrying body 1. In this way, the display device 5 may abuts on the carrying body 1 when the portable terahertz security inspection apparatus is in a non-operating state, and the display device 5 may be pivoted to a proper position for user's view when the portable terahertz security inspection apparatus is in an operating state.

It should be noted that in some other embodiments of the present disclosure, the display device 5 may not be provided. In this case, the terahertz image and the image acquired by the image acquisition system 8 may be transmitted through a wired network or a wireless transmission to an external display device for output.

As shown in FIG. 2 and FIG. 4, in an exemplary embodiment, the portable terahertz security inspection apparatus further includes a hand-held part 6 arranged on a third sidewall of the carrying body 1 opposite to the second sidewall. It should be noted that in some other embodiments of the present disclosure, the hand-held part 6 may also be arranged in other positions, or connected through a soft connection, so that an angle, a position and an elasticity of the hand-held part 6 may be adjusted arbitrarily for the convenience of use.

As shown in FIG. 2 and FIG. 4, in an exemplary embodiment, a power supply device 9 is further provided on the carrying body 1 so as to supply power to the portable terahertz security inspection apparatus. The power supply device 9 generally includes a rechargeable battery, so as to be used outdoors or under special circumstances. Therefore, the portable terahertz security inspection apparatus has good adaptability to special environments such as forests and deserts.

As shown in FIG. 4, in an exemplary embodiment, a control switch 10 is further provided on the carrying body 1 so as to control the operating state of the portable terahertz security inspection apparatus. The control switch 10 is used to perform an external control of the terahertz emitting device 2, the terahertz detection chip 33, the display device 5, etc., and may further be used to adjust an image effect, switch the operating mode of the apparatus, and so on. When necessary, the terahertz emitting device 2 and the terahertz detection chip 33 may be turned off through an internal signal so as to prevent the apparatus from being damaged by abnormal factors.

This embodiment is basically the same as Embodiment 1. For brevity of description, in the description of this embodiment, the technical features same as Embodiment 1 will not be described, and only the difference between this embodiment and Embodiment 1 is described.

Figure 5:
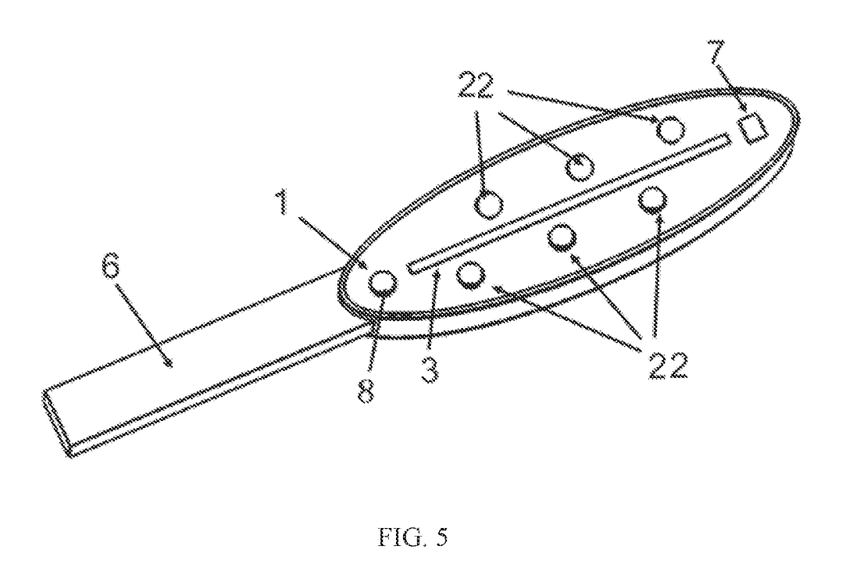
FIG. 5 shows a schematic three-dimensional diagram of a portable terahertz security inspection apparatus according to another exemplary embodiment of the present disclosure.
Figure 6:
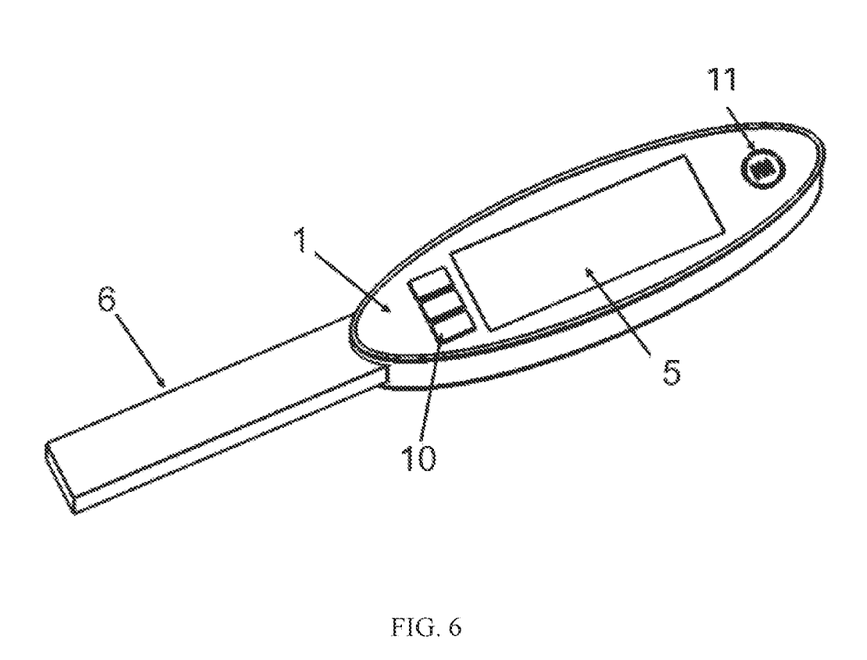
FIG. 6 shows another schematic three-dimensional diagram of the portable terahertz security inspection apparatus shown in FIG. 5.
Figure 7:
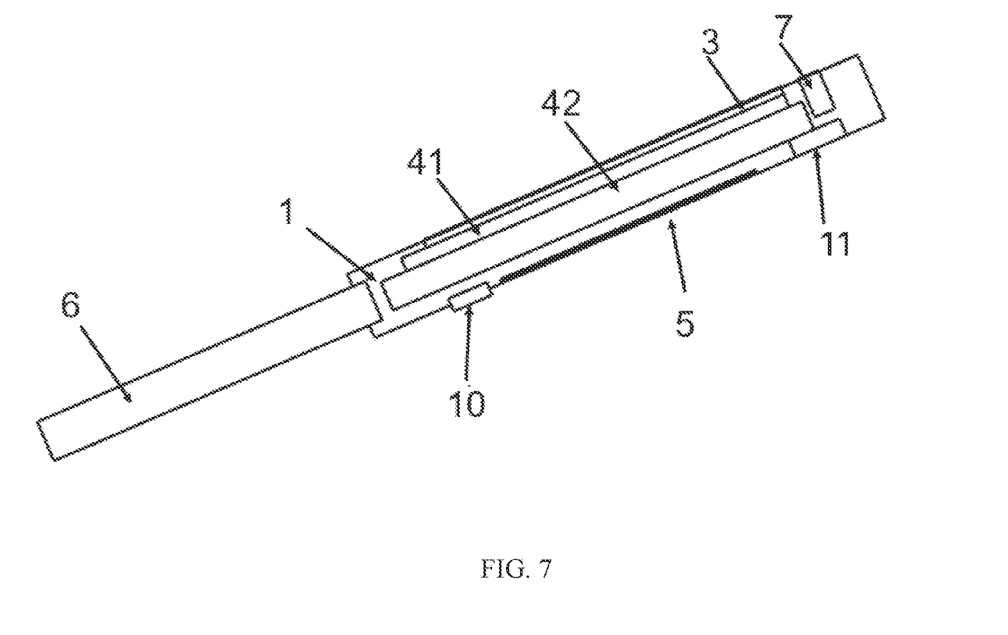
FIG. 7 shows a schematic structural diagram of the portable terahertz security inspection apparatus shown in FIG. 5.

In this embodiment, as shown in FIG. 5 to FIG. 7, the carrying body 1 is formed as a plate-shaped structure. A plurality of emitting units 22 are provided to enhance the brightness of the terahertz image and expand the imaging area. The plurality of emitting units 22 and the terahertz detector 3 are all located on a first side of the carrying body 1, and the plurality of emitting units 22 are arranged around the terahertz detector 3. The display device 5 is arranged on a second side of the carrying body 1 opposite to the first side. In this embodiment, because the terahertz lens 31 is omitted, the user may conveniently perform a close-to-body inspection on the inspected object.

As shown in FIG. 5 to FIG. 7, the hand-held part 6 of the portable terahertz security inspection apparatus is arranged at one end of the carrying body 1 to facilitate the user to hold and use.

As shown in FIG. 5 to FIG. 7, the alarm device 11 of the portable terahertz security inspection apparatus is a buzzer, which issues an audible alarm when it is determined that a suspicious item is contained in the terahertz image generated.

When using the portable terahertz security inspection apparatus, the user directs the apparatus toward an inspected person or item, and moves the apparatus to perform the scanning in a specific scanning way until the scanning area completely covers a desired inspection area. In the entire scanning process, the terahertz wave is generated by the terahertz signal source and shaped by the emitting unit, and finally irradiates the inspected object in a spot shape at a specific irradiation angle. The terahertz wave is then reflected by the inspected object, and the terahertz wave reflected is received by the terahertz detector. The terahertz detector converts the terahertz wave received into an electrical signal and transmits the electrical signal to the data acquisition and processing system. After receiving the signal transmitted by the terahertz detector, the data acquisition and processing system analyzes and calculates the signal and finally converts the signal into an image information output for the user to observe and determine a result of inspection. The user may turn off the portable apparatus in time by the control switch at the end of use, thereby reducing energy consumption and extending apparatus life.

It should be noted that the terahertz signal source 21 here includes, but is not limited to an IMPct Avalanche and Transit Time (IMPATT) diode terahertz source, a terahertz Quantum Cascade Laser (QCL), a terahertz frequency doubled transmission link, and the like. The terahertz emitting device may include one or more terahertz signal sources 21, which is not limited here. In addition, a spectrum composition of the terahertz signal source 21 is not limited. It may be a wide-spectrum terahertz light source, a single frequency source, or a combination of a plurality of different terahertz emitting sources. The emitting unit 22 is generally provided to match with the terahertz signal source 21, and it includes but is not limited to a horn antenna, a shaping lens, a mirror, and the like.

The terahertz detector 3 is used to receive the terahertz wave reflected from the inspected object, convert it into an electrical signal, and transmit the electrical signal to the data acquisition and processing system 4. It should be pointed out that the types and operating principles of the terahertz detector are not limited here. The terahertz detector may include but not be limited to a terahertz focal plane bolometer, a terahertz pyroelectric detector, a heterodyne terahertz receiving link, etc. An arrangement of detection units of the terahertz detector 3 includes, but is not limited to an area array, a linear array, or other arrangements such as a circular arrangement, a square arrangement, and the like. The detection unit of the terahertz detector includes, but is not limited to an imaging lens, a converging lens, a collecting antenna, etc.

The portable terahertz security inspection apparatus according to the embodiments of the present disclosure described above does not need to be equipped with a mechanical scanning system, so that the volume and the weight of the terahertz security inspection apparatus may be greatly reduced. In this way, the security inspector may move the carrying body manually to perform the scanning of the imaging area. Since the portable terahertz security inspection apparatus may be moved easily, it may perform partial imaging on a specific area at any angle, which greatly improves flexibility and practicability of the terahertz imaging technology. In addition, the portable terahertz security inspection apparatus may be used to perform a key inspection on a part where contrabands may be hidden, thereby improving an accuracy of the security inspection. The portable terahertz security inspection apparatus may not only be used for body inspection, but also used to detect items. The portable terahertz security inspection apparatus may be applied to items including but not limited to luggage, mail parcels, carton letters, etc., and may be widely used in various scenarios such as drug detection, smuggling inspection, inspection and quarantine, etc. Especially in summer or some hot areas, the inspected person usually wears less clothes. In this case, it is generally unnecessary to perform scanning imaging on the entire human body. The portable terahertz security inspection apparatus may be used to quickly check the parts where contrabands may be hidden so as to improve the efficiency of security inspection. The portable terahertz security inspection apparatus may also be used under loose safety requirements or other similar situations.

Those skilled in the art may understand that the embodiments described above are exemplary, and those skilled in the art may make improvements. The structures described in the embodiments may be combined freely without conflicts in structure or principle.

After describing the preferred embodiments of the present disclosure in detail, those skilled in the art may clearly understand that various changes and modifications may be made without departing from the scope and spirit of the appended claims, and the present disclosure is not limited to implementations of the exemplary embodiments described in the present disclosure.

What is claimed is:

1. A portable terahertz security inspection apparatus, comprising:
    a carrying body;
    a terahertz emitting device arranged on a top wall of the carrying body, wherein the terahertz emitting device comprises a terahertz signal source and an emitting unit connected to the terahertz signal source and configured to emit a terahertz wave;
    a terahertz detector arranged on the carrying body and configured to receive the terahertz wave reflected from an inspected object, wherein the terahertz detector comprises a terahertz lens, a terahertz detection chip and an adjustment flange;
    a data acquisition and processing system located within the carrying body and connected to the terahertz detector, wherein the data acquisition and processing system is configured to receive a scan data for the inspected object from the terahertz detector and generate a terahertz image;

a display device connected to the data acquisition and processing system and configured to receive and display the terahertz image from the data acquisition and processing system, wherein the display device comprises a display screen; and a distance sensor arranged on the carrying body and connected to the data acquisition and processing system, wherein the distance sensor is configured to sense a distance between the inspected object and the portable terahertz security inspection apparatus;

wherein a pre-processed signal acquired by the terahertz detection chip is compensated and optimized by the data acquisition and processing system based on the distance, and the terahertz lens is automatically calibrated by the adjustment flange based on a distance measured by the distance sensor; and wherein the display device comprises a display base arranged on a second sidewall of the carrying body adjacent to a first sidewall installed with the terahertz lens, the display base is pivotally connected to the carrying body, and the display screen is arranged on a side of the display base close to the carrying body.

2. The portable terahertz security inspection apparatus of claim 1, wherein the data acquisition and processing system comprises a data collector configured to receive the scan data for the inspected object from the terahertz detector, a data processor configured to generate the terahertz image based on the scan data, and an image processor configured to identify a suspicious item contained in the terahertz image generated;

wherein the data collector comprises a receiver for receiving an electrical signal transmitted from the terahertz detection chip and the distance sensor, a convertor for converting the electrical signal into a digital signal, and a transmitter for transmitting the digital signal to the data processor; and wherein the data processor is connected to the image processor.

3. The portable terahertz security inspection apparatus of claim 2, further comprising an alarm device connected to the image processor, wherein the alarm device is configured to issue an alarm in response to identifying the suspicious item contained in the terahertz image by the image processor, and the alarm device is a buzzer.

4. The portable terahertz security inspection apparatus of claim 1, further comprising an image acquisition system arranged on the carrying body and connected to the display device.

5. The portable terahertz security inspection apparatus of claim 4, wherein the display screen has a first display area for displaying the terahertz image and a second display area for displaying an image acquired by the image acquisition system.

6. The portable terahertz security inspection apparatus of claim 1, wherein a power supply device is further provided on the carrying body so as to supply power to the portable terahertz security inspection apparatus, and the power supply device comprises a rechargeable battery.

7. The portable terahertz security inspection apparatus of claim 1, wherein a control switch is further provided on the carrying body so as to control an operating state of the portable terahertz security inspection apparatus.

8. The portable terahertz security inspection apparatus of claim 1, wherein the carrying body is formed as a box structure; the terahertz lens is arranged on a first sidewall of the carrying body and the terahertz detection chip is connected to the terahertz lens and to the data acquisition and processing system.

9. The portable terahertz security inspection apparatus of claim 8, wherein the adjustment flange is configured to adjust a focal length of the terahertz lens.

10. The portable terahertz security inspection apparatus of claim 1, further comprising a hand-held part arranged on a third sidewall of the carrying body opposite to the second sidewall.

11. The portable terahertz security inspection apparatus of claim 1, wherein the carrying body is formed as a plate-shaped structure.

12. The portable terahertz security inspection apparatus of claim 11, wherein the terahertz emitting device comprises a plurality of emitting units, the plurality of emitting units and the terahertz detector are located on a first side of the carrying body, and the plurality of emitting units are arranged around the terahertz detector.

13. The portable terahertz security inspection apparatus of claim 12, wherein the display device is arranged on a second side of the carrying body opposite to the first side.

14. The portable terahertz security inspection apparatus of claim 11, further comprising a hand-held part connected to one end of the carrying body.

* * * * *